US010077713B2

(12) United States Patent
Gysling et al.

(10) Patent No.: US 10,077,713 B2
(45) Date of Patent: Sep. 18, 2018

(54) SELF-PRESSURIZING FILM DAMPER

(71) Applicant: United Technologies Corporation, Farmington, CT (US)

(72) Inventors: Daniel L. Gysling, South Glastonbury, CT (US); Gregory M. Savela, Stuart, FL (US); Robert J. Morris, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 40 days.

(21) Appl. No.: 15/161,871

(22) Filed: May 23, 2016

(65) Prior Publication Data

US 2017/0335767 A1 Nov. 23, 2017

(51) Int. Cl.
*F02C 7/06* (2006.01)
*F02K 3/02* (2006.01)
*F16C 27/04* (2006.01)
*F16C 19/06* (2006.01)
*F01D 25/04* (2006.01)
*F01D 25/18* (2006.01)
(Continued)

(52) U.S. Cl.
CPC .............. *F02C 7/06* (2013.01); *F01D 25/164* (2013.01); *F01D 25/183* (2013.01); *F02K 3/025* (2013.01); *F16C 27/045* (2013.01); *F16F 15/0237* (2013.01); *F05D 2260/96* (2013.01); *F16C 19/06* (2013.01); *F16C 2360/23* (2013.01); *F16F 2230/30* (2013.01)

(58) Field of Classification Search
CPC .......... F02C 7/06; F02K 3/025; F16C 27/045; F16C 2360/23; F16C 35/077; F16C 19/527; F05D 2260/96; F05D 2220/32; F05D 2224/50; F16D 25/183; F16D 25/164; F06D 2240/60; F16F 2230/30
USPC .. 384/99, 462, 462.473–474, 548, 215, 530, 384/535–536, 581; 277/311, 382, 436, 277/620, 910
See application file for complete search history.

(56) References Cited

U.S. PATENT DOCUMENTS 3,158,413 A   11/1964   Shelley
3,836,215 A * 9/1974   Dopkin ................. F16C 27/045
                                                          384/99
(Continued)

FOREIGN PATENT DOCUMENTS

EP     2388444 A2     11/2011
EP     3106685 A1 *  12/2016   ............. F01D 25/18
(Continued)

OTHER PUBLICATIONS

European Search Report Issued in EP Application No. 17172496.6, dated Nov. 23, 2017, 7 Pages.

*Primary Examiner* — Marcus Charles
(74) *Attorney, Agent, or Firm* — Cantor Colburn LLP

(57) ABSTRACT

A film damper for a gas turbine engine includes an annular inner member and an annular outer member located radially outboard of the annular inner member, the annular outer member and the annular inner member defining a damper annulus therebetween. A fluid supply passage delivers a flow of fluid into the damper annulus from the annular outer member, and a backflow prevention device is located at the fluid supply passage to prevent backflow of the flow of fluid from the damper annulus into the fluid supply passage.

17 Claims, 4 Drawing Sheets

(51) Int. Cl.
*F01D 25/16* (2006.01)
*F16F 15/023* (2006.01)

(56) References Cited

U.S. PATENT DOCUMENTS

| | | | | |
|---|---|---|---|---|
| 4,214,796 | A | | 7/1980 | Monzel et al. |
| 4,329,000 | A | | 5/1982 | Keske |
| 4,693,616 | A | * | 9/1987 | Rohra .................. F01D 25/164 384/99 |
| 4,775,248 | A | * | 10/1988 | Barbic ................ F16F 15/0237 384/99 |
| 5,071,262 | A | * | 12/1991 | Monzel ................ F01D 25/164 384/581 |
| 5,149,206 | A | * | 9/1992 | Bobo .................. F01D 25/164 248/562 |
| 5,169,241 | A | | 12/1992 | Singh |
| 5,178,400 | A | * | 1/1993 | Singh .................. F01D 25/164 277/644 |
| 5,797,684 | A | * | 8/1998 | Becker ................ F01D 25/164 384/99 |
| 6,872,003 | B2 | * | 3/2005 | Dusserre-Telmon ........................ F01D 25/164 384/99 |
| 7,040,811 | B2 | * | 5/2006 | Dusserre-Telmon ........................ F16C 27/045 384/475 |
| 9,752,616 | B2 | * | 9/2017 | Saadi .................. F16C 33/1065 |
| 2016/0160924 | A1 | * | 6/2016 | Meyers ................ F01D 25/164 384/474 |
| 2016/0369652 | A1 | * | 12/2016 | Morris .................. F01D 25/18 |

FOREIGN PATENT DOCUMENTS

| | | | | |
|---|---|---|---|---|
| JP | 11141545 | A | | 5/1999 |
| JP | 2012241769 | A | * | 12/2012 |
| KR | 20030023123 | A | * | 3/2003 |

\* cited by examiner

SELF-PRESSURIZING FILM DAMPER

BACKGROUND

This disclosure relates to gas turbine engines, and more particularly to squeeze film dampers utilized in gas turbine engines.

Squeeze film dampers are widely used in gas turbine engines to minimize rotor deflections. The damper is typically contained in a bearing compartment filled with air. A damper film is supplied by oil at an elevated pressure. The oil within the squeeze film damper provides resistance to rotor whirl as it is pushed around the damper annulus. Eventually the oil flows through the end seals of the damper into the bearing compartment where the oil is scavenged and recirculated through an engine lubrication system.

The squeeze film damper generates a force on the rotor by squeezing a film of oil between two cylindrical cross-sectional regions, the outer region fixed to supports and considered rigid, and the inner region whirling with the rotor. A pressure field is developed as the rotor whirls, resolving the net force acting on the rotor with components aligned with the eccentricity and components parallel and perpendicular to the eccentricity, which enables the forces to be expressed in terms of a squeeze film damper generated stiffness and damping constant, respectively. There is a resultant region of positive pressure with respect to the circumferential mean of the pressure within the damper, and also a region in which the pressure is reduced to below a mean pressure.

In the typical system, the mean pressure, or "steady" pressure, within the damper is typically set by the characteristics of the oil supply system and the leakage of the oil through the seals. As the seals approach ideal seals, i.e. no leakage, the mean pressure approaches the supply pressure. The unsteady part of the pressure, or dynamic pressure amplitude, builds with whirl amplitude. The larger the whirl, the larger the dynamic pressure amplitude becomes. This idealized model works well conceptually until the zero-to-peak amplitude of the dynamic pressure exceeds that of the steady pressure. At this point, the simplified model begins to predict negative pressure over certain regions of the circumference. While negative pressures are conceptually possible in some situations, the prediction of negative pressures typically implies that the oil will either cavitate, or the seals on the ends of the damper will back-flow air from within the bearing compartment into the squeeze film region, or some combination of both. Once air, or typically any gas, is entrained within the squeeze film damper, the effectiveness of the damper, and the ability of analytical models to predict the performance of the damper, becomes compromised.

From a design perspective, it is typically preferable to design squeeze film dampers with sufficient mean pressure such that the dynamic pressure does not result in regions of negative pressure. However, in some cases, it is impractical to provide sufficient supply pressure to achieve the desired damping and stiffness characteristics from the damper.

SUMMARY

In one embodiment, a film damper for a gas turbine engine includes an annular inner member and an annular outer member located radially outboard of the annular inner member, the annular outer member and the annular inner member defining a damper annulus therebetween. A fluid supply passage delivers a flow of fluid into the damper annulus from the annular outer member, and a backflow prevention device is located at the fluid supply passage to prevent backflow of the flow of fluid from the damper annulus into the fluid supply passage.

Additionally or alternatively, in this or other embodiments the fluid supply passage includes a circumferentially extending fluid plenum disposed at the annular outer member.

Additionally or alternatively, in this or other embodiments the backflow prevention device is a plurality of reed valves.

Additionally or alternatively, in this or other embodiments the plurality of reed valves are located between a circumferential supply plenum and the damper annulus.

Additionally or alternatively, in this or other embodiments one or more sealing elements extend between the annular outer member and the annular inner member.

Additionally or alternatively, in this or other embodiments the one or more sealing elements are one or more O-rings and/or one or more piston rings.

Additionally or alternatively, in this or other embodiments a fill port is fluidly coupled to the fluid supply passage. The fill port has a first throat portion and a second portion extending from the first throat portion increasing an effective radial clearance between the fill port and the fluid supply passage.

In another embodiment, a shaft arrangement for a gas turbine engine includes a shaft located at and rotatable about an engine axis and a film damper located at the shaft to reduce or attenuate vibration of the shaft. The film damper includes an annular inner member surrounding the shaft and an annular outer member located radially outboard of the annular inner member, the annular outer member and the annular inner member defining a damper annulus therebetween. A fluid supply passage delivers a flow of fluid into the damper annulus from the annular outer member, and a backflow prevention device is located at the fluid supply passage to prevent backflow of the flow of fluid from the damper annulus into the fluid supply passage.

Additionally or alternatively, in this or other embodiments the fluid supply passage includes a circumferentially extending fluid plenum located at the annular outer member.

Additionally or alternatively, in this or other embodiments the backflow prevention device is a plurality of reed valves.

Additionally or alternatively, in this or other embodiments the plurality of reed valves are located between a circumferential supply plenum and the damper annulus.

Additionally or alternatively, in this or other embodiments one or more sealing elements extend between the annular outer member and the annular inner member.

Additionally or alternatively, in this or other embodiments the one or more sealing elements are one or more O-rings and/or one or more piston rings.

Additionally or alternatively, in this or other embodiments a fill port is fluidly coupled to the fluid supply passage, the fill port having a first throat portion and a second portion extending from the first throat portion increasing an effective radial clearance between the fill port and the fluid supply passage.

Additionally or alternatively, in this or other embodiments a rolling element bearing is located radially between the annular inner member and the shaft.

Additionally or alternatively, in this or other embodiments the shaft is one of a high speed shaft or a low speed shaft of the gas turbine engine.

In yet another embodiment, a gas turbine engine includes a shaft located at and rotatable about an engine axis, and an oil film damper located at the shaft to reduce or attenuate vibration of the shaft. The oil film damper includes an annular inner member surrounding the shaft, and an annular outer member located radially outboard of the annular inner member, the annular outer member and the annular inner member defining a damper annulus therebetween. A fluid supply passage delivers a flow of fluid into the damper annulus from the annular outer member, and a backflow prevention device located at the fluid supply passage to prevent backflow of the flow of fluid from the damper annulus into the fluid supply passage.

Additionally or alternatively, in this or other embodiments the fluid supply passage includes a circumferentially extending fluid plenum located at the annular outer member.

Additionally or alternatively, in this or other embodiments the backflow prevention device is a plurality of reed valves.

Additionally or alternatively, in this or other embodiments a fill port is fluidly coupled to the fluid supply passage, the fill port having a first throat portion and a second portion extending from the first throat portion increasing an effective radial clearance between the fill port and the fluid supply passage.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
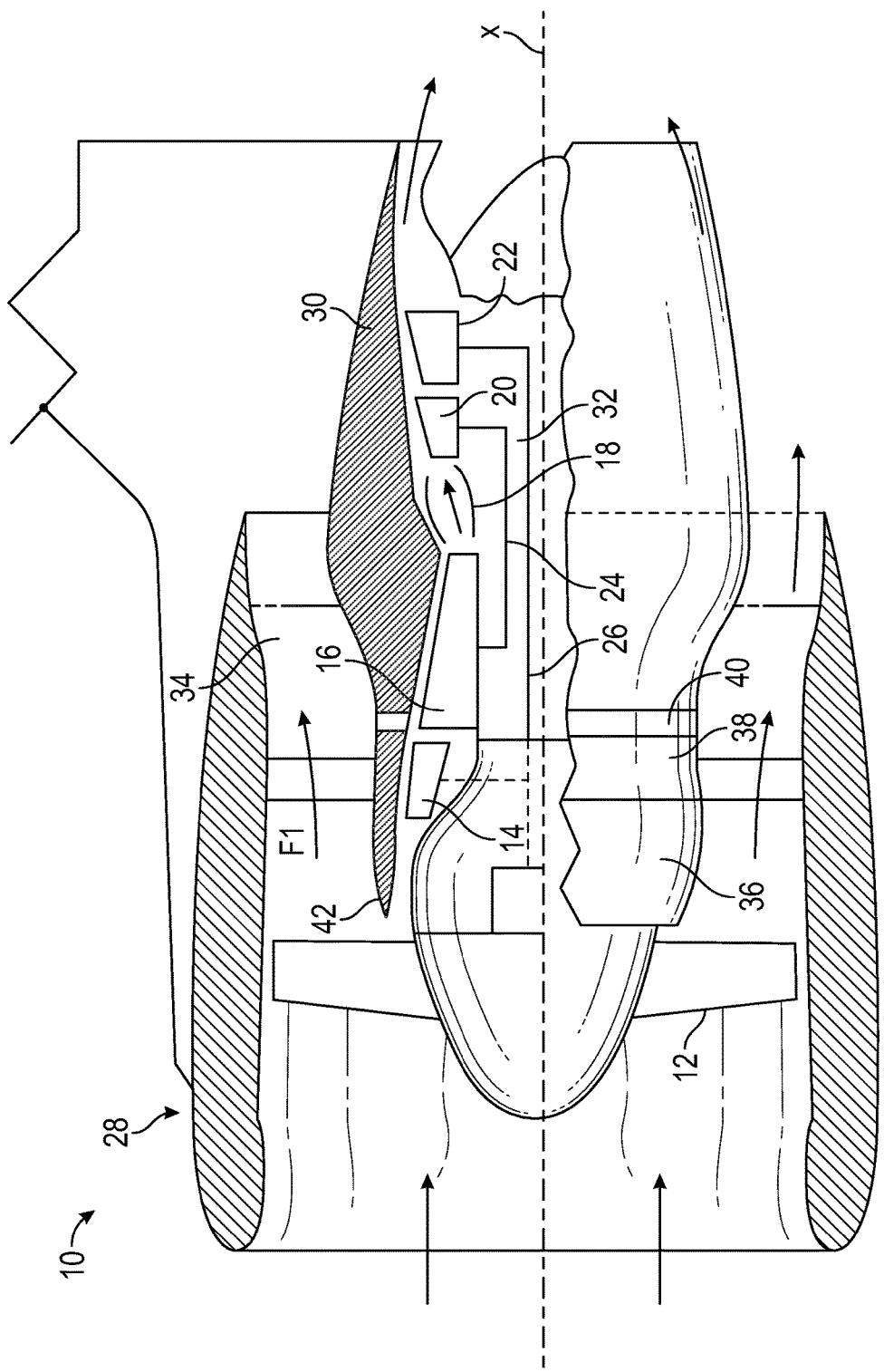
FIG. 1 is a cross-sectional view of an embodiment of a gas turbine engine.

FIG. 1 is a schematic illustration of a gas turbine engine 10. The gas turbine engine generally has includes fan section 12, a low pressure compressor 14, a high pressure compressor 16, a combustor 18, a high pressure turbine 20 and a low pressure turbine 22. The gas turbine engine 10 is circumferentially disposed about an engine centerline X. During operation, air is pulled into the gas turbine engine 10 by the fan section 12, pressurized by the compressors 14, 16, mixed with fuel and burned in the combustor 18. Hot combustion gases generated within the combustor 18 flow through high and low pressure turbines 20, 22, which extract energy from the hot combustion gases.

In a two-spool configuration, the high pressure turbine 20 utilizes the extracted energy from the hot combustion gases to power the high pressure compressor 16 through a high speed shaft 24, and the low pressure turbine 22 utilizes the energy extracted from the hot combustion gases to power the low pressure compressor 14 and the fan section 12 through a low speed shaft 26. The present disclosure, however, is not limited to the two-spool configuration described and may be utilized with other configurations, such as single-spool or three-spool configurations, or gear-driven fan configurations.

Gas turbine engine 10 is in the form of a high bypass ratio turbine engine mounted within a nacelle or fan casing 28 which surrounds an engine casing 30 housing an engine core 32. A significant amount of air pressurized by the fan section 12 bypasses the engine core 32 for the generation of propulsive thrust. The airflow entering the fan section 12 may bypass the engine core 32 via a fan bypass passage 34 extending between the fan casing 28 and the engine casing 30 for receiving and communicating a discharge flow F1. The high bypass flow arrangement provides a significant amount of thrust for powering an aircraft.

The engine casing 30 generally includes an inlet case 36, a low pressure compressor case 38, and an intermediate case 40. The inlet case 36 guides air to the low pressure compressor case 38, and via a splitter 42 also directs air through the fan bypass passage 34.

Figure 2:
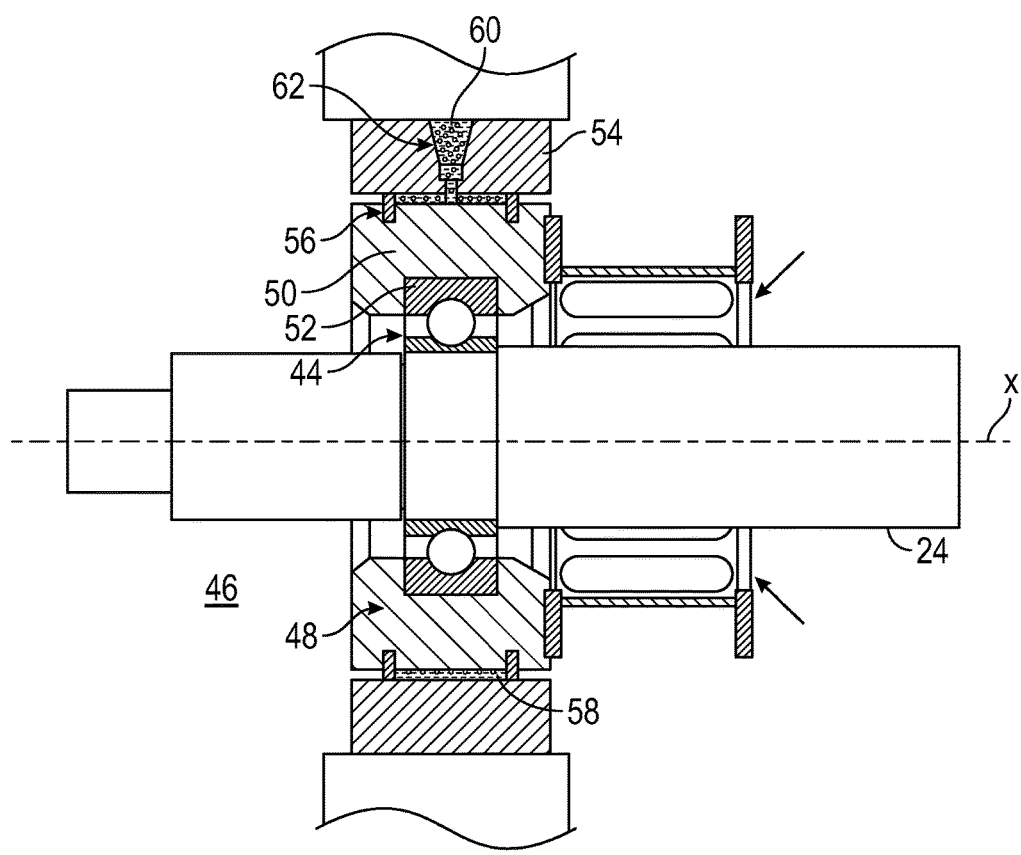
FIG. 2 is a cross-sectional view of an embodiment of a squeeze film damper arrangement for a gas turbine engine.

Referring now to FIG. 2, illustrated is an embodiment of a shaft of the gas turbine engine 10, for example high speed shaft 24. While the present description is in the context of the high speed shaft 24, the present disclosure may be readily utilized with low speed shaft 26. The high speed shaft 24 is supported by a bearing, for example, a rolling element bearing 44 located at a bearing housing 46. The rolling element bearing 44 is, in turn, supported by a rotationally fixed damper housing 48. The damper housing 48 includes an inboard element 50 to which a bearing outer race 52 of the rolling element bearing 44 is secured. An outboard element 54 of the damper housing 48 is located radially outboard of the inboard element 50 with two O-ring seals 56 or other seal elements such as piston ring seals to define a damper annulus 58 between the O-ring seals 56 and between the inboard element 50 and the outboard element 54. The damper annulus 58 extends circumferentially about the engine centerline X.

The damper annulus 58 is supplied with a flow of oil 60 from one or more oil supply ports 62 located at the outboard element 54. The flow of oil 60 fills the damper annulus 58 to dampen vibration of the high speed shaft 24. The flow of oil 60 eventually seeps through or around the O-ring seals 56 and into the bearing housing 46, where it is scavenged.

Figure 3:
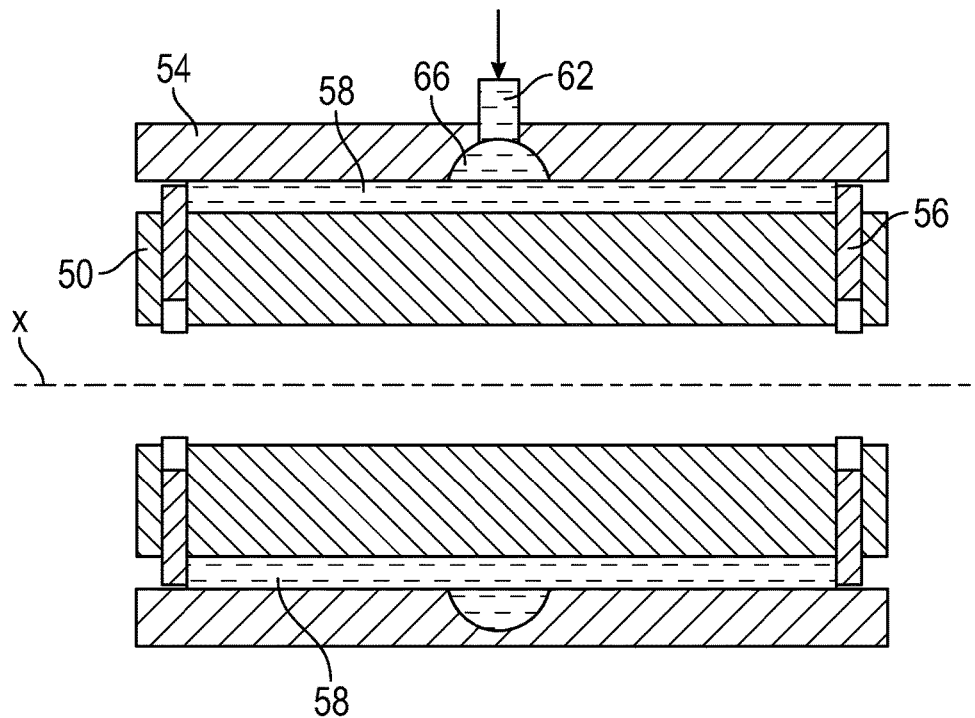
FIG. 3 is a schematic view of an embodiment of a damper arrangement having a circumferential supply plenum.

In some embodiments, as shown in FIG. 3, the outboard element 54 includes a circumferential supply plenum 64 (shown best in FIG. 4), which in some embodiments is defined by a circumferential groove 66 in the outboard element 54, extending from the one or more oil supply ports 62. The circumferential supply plenum 64 aids in ensuring that there is an ample supply of oil around the circumference of the damper annulus 58.

Figure 4:
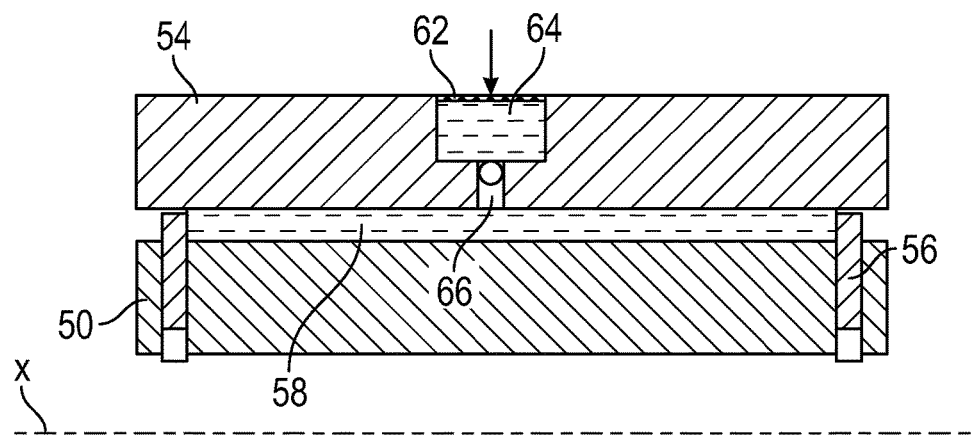
FIG. 4 is schematic view of an embodiment of a damper arrangement including a plurality of check valves.
Figure 5:
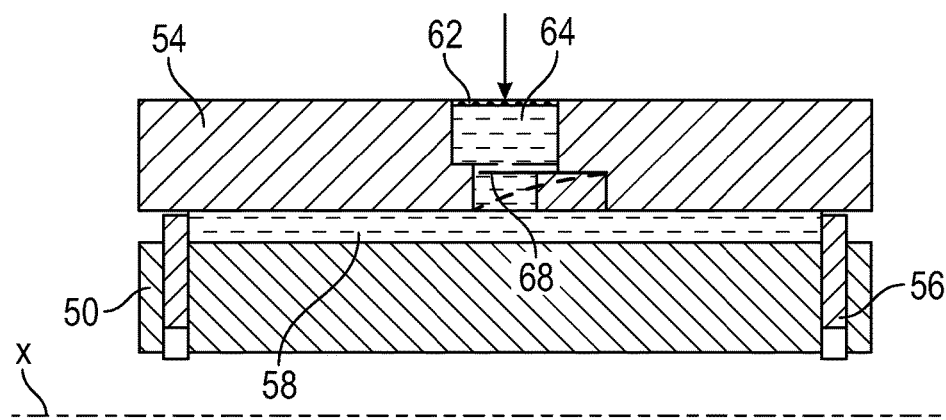
FIG. 5 is a schematic view of an embodiment of a damper arrangement including an array of reed valves.

In a typical squeeze film damper arrangement, certain operating conditions such as whirl of the high speed shaft 24 can lead to localized back flow of the flow of oil 60 at certain circumferential locations of the supply plenum 64. Referring now to FIG. 4, locally-reacting, fill-only check valves 66 may be positioned between the supply plenum 64 and the damper annulus 58. In some embodiments, multiple check valves 66 are distributed around the circumference of the damper annulus 58. The check valves 66 are fill-only, such that the flow of oil 60 can proceed from the supply plenum 64 into the damper annulus 58, but the flow of oil 60 is prevented from flowing in the opposite direction, from the damper annulus 58 into the supply plenum 64. The net result is an increase in net mass flow of the flow of oil 60 into the damper annulus 58 and an ability to better support a circumferential pressure gradient within the damper annulus 58. In some embodiments, as shown in FIG. 5, rather than check valves 66, a plurality of reed valves 68 may be positioned between the supply plenum 64 and the damper annulus 58 to prevent backflow of the flow of oil 60 from the damper annulus 58 into the supply plenum 64.

Check valves 66 and/or reed valves 68 are particularly effective for squeeze film dampers operating with 1) "low" supply pressure and 2) "low" supply impedance. Low supply pressure implies that the intended, idealized amplitude of the circumferential pressure distribution approaches an offset between supplied pressure and damper annulus 58 pressure. Low supply impedance means that the pressure of the inlet oil supply is not significantly influenced by the mass flow supplied to the damper annulus 58, for example, if the oil supplied to the damper annulus 58 is supplied by "teeing off" a small fraction of a larger oil flow into the bearing housing 46.

Figure 6:
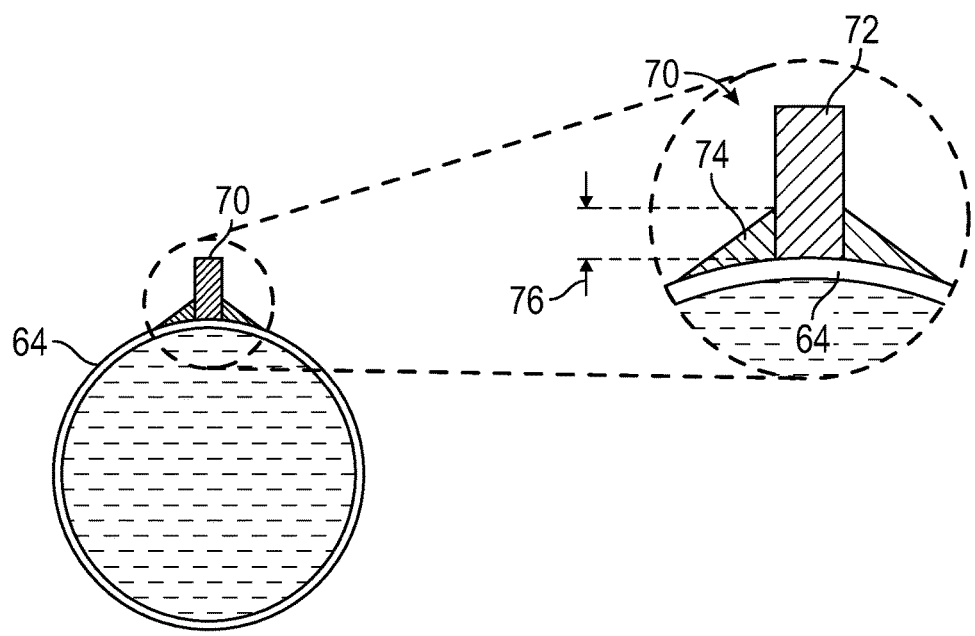
FIG. 6 is a schematic view of an embodiment of a damper arrangement having a fill port with increased radial clearance to a supply plenum.

To further reduce impedance of the flow of oil 60, as shown in FIG. 6, a fill port 70 extends from a relatively narrow throat portion 72 circumferentially outwardly to a relatively wider outlet portion 74 of the fill port 70 at the supply plenum 64 to increase an effective radial clearance 76 at the fill port 70. This reduces flow losses at an entrance to the supply plenum 64 from the fill port 70. The increased effective radial clearance 76 may also be accomplished, utilizing radial grooves in the fill port 70 or enlarging the fill port 70 diameter near the supply plenum 64 interface with the fill port 70. This clearance relief should extend a sufficient distance from the fill port 70 to sufficiently reduce the in-flow impedance.

Increasing oil supply pressure is well known to improve damper effectiveness. However, increasing oil supply pressure at low rotational speeds is often impractical. The present disclosure provides to increase the flow of oil 60 pressure within the damper annulus 58, without increasing supply pressure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A film damper for a gas turbine engine comprising:
an annular inner member;
an annular outer member located radially outboard of the annular inner member, the annular outer member and the annular inner member defining a damper annulus therebetween;
a fluid supply passage to deliver a flow of fluid into the damper annulus from the annular outer member;
a backflow prevention device disposed at the fluid supply passage to prevent backflow of the flow of fluid from the damper annulus into the fluid supply passage; and
a fill port fluidly coupled to the fluid supply passage, the fill port having a first throat portion and a second portion extending circumferentially outwardly from the first throat portion increasing an effective radial clearance between the fill port and the fluid supply passage.

2. The film damper of claim 1, wherein the fluid supply passage includes a circumferentially extending fluid plenum disposed at the annular outer member.

3. The film damper of claim 1, wherein the backflow prevention device is a plurality of reed valves.

4. The film damper of claim 3, wherein the plurality of reed valves are disposed between a circumferential supply plenum and the damper annulus.

5. The film damper of claim 1, further comprising one or more sealing elements extending between the annular outer member and the annular inner member.

6. The film damper of claim 1, wherein the one or more sealing elements are one or more O-rings or one or more piston rings.

7. A shaft arrangement for a gas turbine engine, comprising:
a shaft disposed at and rotatable about an engine axis;
a film damper disposed at the shaft to reduce or attenuate vibration of the shaft, the film damper including:
an annular inner member surrounding the shaft;
an annular outer member located radially outboard of the annular inner member, the annular outer member and the annular inner member defining a damper annulus therebetween;
a fluid supply passage to deliver a flow of fluid into the damper annulus from the annular outer member;
a backflow prevention device disposed at the fluid supply passage to prevent backflow of the flow of fluid from the damper annulus into the fluid supply passage; and
a fill port fluidly coupled to the fluid supply passage, the fill port having a first throat portion and a second portion extending circumferentially outwardly from the first throat portion increasing an effective radial clearance between the fill port and the fluid supply passage.

8. The shaft arrangement of claim 7, wherein the fluid supply passage includes a circumferentially extending fluid plenum disposed at the annular outer member.

9. The shaft arrangement of claim 7, wherein the backflow prevention device is a plurality of reed valves.

10. The shaft arrangement of claim 9, wherein the plurality of reed valves are disposed between a circumferential supply plenum and the damper annulus.

11. The shaft arrangement of claim 7, further comprising one or more sealing elements extending between the annular outer member and the annular inner member.

12. The shaft arrangement of claim 7, wherein the one or more sealing elements are one or more O-rings or one or more piston rings.

13. The shaft arrangement of claim 7, further comprising a rolling element bearing disposed radially between the annular inner member and the shaft.

14. The shaft arrangement of claim 7, wherein the shaft is one of a high speed shaft or a low speed shaft of the gas turbine engine.

15. A gas turbine engine, comprising:
a shaft disposed at and rotatable about an engine axis;
an oil film damper disposed at the shaft to reduce or attenuate vibration of the shaft, the oil film damper including:
an annular inner member surrounding the shaft;
an annular outer member located radially outboard of the annular inner member, the annular outer member and the annular inner member defining a damper annulus therebetween;

a fluid supply passage to deliver a flow of fluid into the damper annulus from the annular outer member;

a backflow prevention device disposed at the fluid supply passage to prevent backflow of the flow of fluid from the damper annulus into the fluid supply passage; and a fill port fluidly coupled to the fluid supply passage, the fill port having a first throat portion and a second portion extending circumferentially outwardly from the first throat portion increasing an effective radial clearance between the fill port and the fluid supply passage.

16. The gas turbine engine of claim 15, wherein the fluid supply passage includes a circumferentially extending fluid plenum disposed at the annular outer member.

17. The gas turbine engine of claim 15, wherein the backflow prevention device is a plurality of reed valves.

\* \* \* \* \*